United States Patent Office 3,416,479
Patented Dec. 17, 1968

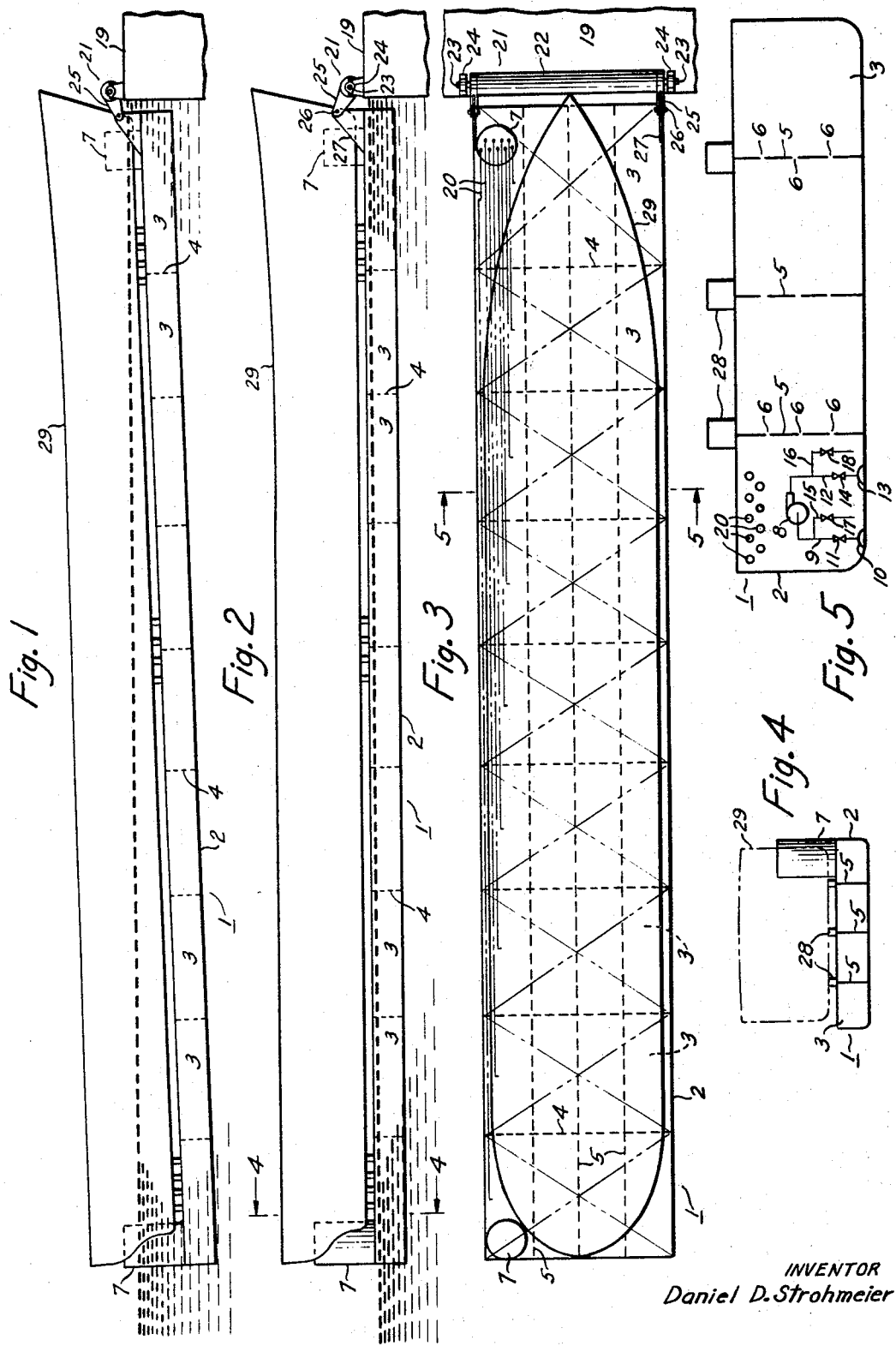

3,416,479
FLOATING DRY DOCK
Daniel D. Strohmeier, Scarsdale, N.Y., assignor to Bethlehem Steel Corporation, a corporation of Delaware
Filed Jan. 19, 1967, Ser. No. 610,320
6 Claims. (Cl. 114—45)

ABSTRACT OF THE DISCLOSURE

A floating dry dock having a mechanical linkage connecting one end of the dock with the shore to provide transverse stability during docking and undocking operations. The dock does not have conventional wing walls. Instead, two stabilizing columns, one at each end of one side of the dock, provide longitudinal stability and control amount of sinkage when the dock is submerged.

Background of the invention

This invention pertains to a floating dry dock for raising a vessel out of the water and for docking the vessel for repairs or other operations, and for lowering the vessel back into the water.

Conventional floating dry docks usually have two wing walls extending along the two sides of the dock to provide longitudinal and transverse stability. Docks of this type, as exemplified by "A Treatise on the Principles and Practice of Dock Engineering," Brysson Cunningham (1914), p. 479, become inordinately expensive when they are dimensioned to handle the larger vessels now in use or under, or planned for, construction. Moreover, these docks would require wide berths.

It has been proposed, in British Patent 5889 of 1883 to Standfield, to employ a floating dry dock with a wingwall extending along only one side of the dock, with a mechanical linkage connecting the wingwall side of the dock to shore, and the patentee suggests that this wingwall can be replaced by a series of buoyant cylinders. However, the side of the dock supporting the wingwall or series of cylinders must project laterally considerably beyond the side of the vessel being docked and therefor, the width of the dock, and of its berth, remains quite large, although smaller than the double wingwall dock. Moreover, the mechanical linkage at the side of the dock is not as effective in providing transverse stability during docking operations as the bow-connected mechanical linkage of the present invention.

Summary of the invention

An object of this invention is to provide a floating dry dock adapted to raise and dock large vessels, wherein the ratio of vessel beam to dock width is more favorable than with conventional dry docks.

A further object of this invention is to provide a floating dry dock with a mechanical linkage assuring adequate transverse stability.

Other and further objects of this invention will become apparent during the course of the description and by reference to the accompanying drawing and appended claims.

I have discovered that the foregoing objects can be attained by mounting two stabilizing columns one at each end of one side of a shallow ballastable pontoon, the said columns providing longitudinal stability, the pontoon and columns constituting a floating dry dock, and by connecting one end of the dock to the shore through a mechanical linkage to provide transverse stability.

Brief description of the drawing

Referring now to the drawing in which like numerals represent like parts in the several views:

FIGURE 1 represents a view in side elevation of the dry dock in submerged condition in the course of raising and docking a vessel.

FIGURE 2 represents a view in side elevation of the dry dock in raised position, showing the vessel docked and ready for repairs or similar operations.

FIGURE 3 represents a view in plan of the dry dock, showing the outline of the vessel being docked.

FIGURE 4 represents a view in transverse section of the dry dock, taken along the line 4—4 of FIGURE 2, showing the vessel in phantom.

FIGURE 5 represents an enlarged view in transverse section of the dry dock pontoon, taken along the line 5—5 of FIGURE 3, showing schematically one means for varying the ballast condition of the dry dock.

Description of the preferred embodiment

Floating dry dock 1 is seen as comprising a relatively shallow pontoon 2 subdivided into a number of compartments 3 longitudinally of the pontoon 2 by means of watertight transverse bulkheads 4 extending from side to side and from top to bottom of the said pontoon 2. Longitudinal bulkheads 5 extend from end to end and from top to bottom of the pontoon for stiffening purposes, and are non-watertight as indicated by openings 6.

At each end of one side of the pontoon 2, a stabilizing column 7 is provided, the said column 7 being in communication with the compartment 3 at the respective end of the pontoon 2. It will be seen that the diameter of the columns 7 is quite small relative to the length and breadth of pontoon 2. This arrangement provides a substantially unobstructed top surface to pontoon 2 for a reason which will hereinafter appear.

Means are provided to ballast and deballast the several compartments 3 of pontoon 2. Such means are well known in the art. I show, schematically only, one arrangement for ballasting and deballasting the compartment 3, and it is to be understood that this is illustrative only. As so shown, a submersible pump 8 is provided in each compartment. Conduit 9 communicates between sea chest 10 and the pump intake, and is provided with valve 11. Conduit 12 communicates between the pump discharge and sea chest 13, and is provided with valve 14. Between valves 11 and 14 and the pump 8, in conduits 9 and 12 respectively, are branch conduits 15 and 16 with valves 17 and 18 respectively and adapted to be placed in communication with compartment 3. Submersible pump 8 and valves 11, 14, 17 and 18 are remotely controlled, as from pier 19 or a suitable working platform on top of one column 7, by means known in the art. An air venting conduit 20 is provided for each compartment 3 and, conveniently, the conduits 20 can extend to and through the top of column 7 for communication with the atmosphere.

Mechanical linkage 21 is connected between one end of pontoon 2 and pier 19, and comprises a tube member 22 with trunnions 23 at each end thereof rotatably mounted in bearings 24, the said bearings 24 being firmly anchored to pier 19. Arms 25, rigidly secured to each end of tube member 22, are pivotally secured by means of pins 26 to arms 27, the said arms 27 being firmly anchored to both sides of that end of pontoon 2 adjacent pier 19. Thus, pontoon 2 (and hence floating dry dock 1) is positively restrained from rotational movement about the longitudinal axis thereof; i.e., mechanical linkage 21 transversely stabilizes the floating dry dock 1. At the same time, it will be seen that that end of pontoon 2 adjacent pier 19 is capable of a certain amount of vertical movement.

The top of pontoon 2 is provided with the customary keel blocks 28 for use in the known manner to support vessel 29.

*Operation of the preferred embodiment*

Assuming that dry dock 1 is in floating condition, it is ballasted by operating pumps 8, in the several compartments 3 of pontoon 2, with valves 11 and 18 open and valves 14 and 17 closed. As ballast water is taken on in the compartments 3, displaced air exits through conduits 20. Dry dock 1 sinks in an angular position, as shown in FIGURE 1, transverse stability being provided by mechanical linkage 21. It will be noted that that end of dry dock 1 adjacent pier 19 is capable of a certain amount of vertical movement, and columns 7 provide longitudinal stability as well as control over the amount of sinkage of dry dock 1 after pontoon 2 has been submerged.

Vessel 29 is now floated over pontoon 2. It will be observed that dry dock 1 can accommodate a vessel 29 of beam substantially equal to that of pontoon 2 and of length substantially equal to that of pontoon 2. It will be particularly noted that the vessel 29, having the conventional profile in plan as shown in FIGURE 3, does not overlie those corners of pontoon 2 supporting columns 7 even though the midships section of the vessel 29 may be practically the same as that of the pontoon 2. It will be appreciated from the foregoing that dry dock 1 therefore occupies substantially no more space areawise than the largest vessel 29 which it can accommodate. Dry dock 1 is now deballasted by operating pumps 8 in the several compartments 3 of pontoon 2, with valves 17 and 14 open and valves 11 and 18 closed. As ballast water is discharged, air enters compartments 3 through conduits 20. Dry dock 1 rises and engages, through keel blocks 28, vessel 29, and this operation is continued until dry dock 1 reaches docking position as shown in FIGURE 2.

Upon completion of repairs or other operations to vessel 29, dry dock 1 is submerged in the manner heretofore described, and vessel 29 is floated off pontoon 2.

It should be noted that pontoon 2 is relatively shallow in comparison to its length. In order to avoid excessive longitudinal bending moments, it may be desired to ballast or deballast each compartment 3 differently from the other compartments 3 (as distinguished from ballasting or deballasting all compartments 3 to the same extent) in light of the longitudinal loading conditions on pontoon 2.

Longitudinal bulkheads 5 have been described as nonwatertight. This permits a constant or equal amount of ballasting or deballasting transversely of each compartment 3, and insures that no transverse twisting moments are created by unintentional unequal transverse ballasting across each compartment 3.

I claim:

1. A floating dry dock for use in a body of water in association with a fixed structure, said dry dock being adapted to raise a vessel out of the body of water or selectively to deposit the vessel in the body of water, said dry dock comprising:
   (a) a pontoon having an upper surface adapted to support a vessel, said pontoon having a longitudinal axis, the length between ends of said pontoon being substantially greater than the width between sides of said pontoon, the depth of said pontoon being relatively shallow,
   (b) means to ballast or selectively to deballast said ponton,
   (c) mechanical linkage means connected to said pontoon adjacent one end thereof and adapted to be connected to said fixed structure, said mechanical linkage means permitting rotation of said pontoon in said body of water about a horizontal axis perpendicular to the longitudinal axis of said pontoon, said mechanical linkage means restraining rotation of said pontoon about an axis parallel to the longitudinal axis of said pontoon,
   (d) a stabilizing column for providing longitudinal stability rigidly connected to a corner of said pontoon in substantially unobstructing relation to the upper surface of said pontoon, said corner being located at the end opposite said one end, said stabilizing column being of height sufficient to extend above the surface of the body of water when said pontoon is submerged.
   (e) said pontoon being adapted to support a vessel having a width substantially equal to the width of said pontoon with the longitudinal axis of said vessel substantially parallel to the longitudinal axis of said pontoon.

2. Apparatus as in claim 1, said mechanical linkage means comprising:
   (f) a pair of first arms rigidly secured to opposite sides of said pontoon adjacent one end thereof,
   (g) an elongated member adapted to be rotatably mounted to said fixed structure about a horizontal axis perpendicular to the longitudinal axis of said pontoon,
   (h) a pair of second arms rigidly mounted to opposite ends of said elongated member,
   (i) means pivotally mounting each of said second arms to one of said first arms.

3. Apparatus as in claim 1, said mechanical linkage means comprising:
   (f) an elongated member of length substantially equal to the width of said pontoon,
   (g) bearing means adapted to be rigidly mounted on said fixed structure, said bearing means rotatably supporting said elongated member about a horizontal axis perpendicular to the longitudinal axis of said pontoon, the center between ends of said elongated member registering with the longitudinal axis of said pontoon,
   (h) a first arm at each end of said elongated member rigidly secured thereto,
   (i) a second arm at each side of said pontoon adjacent one end thereof,
   (j) means pivotally mounting each of said first arms to one of said second arms.

4. A floating dry dock for use in a body of water in association with a fixed structure, said dry dock being adapted to raise a vessel out of the body of water or selectively to deposit the vessel in the body of water, said dry dock comprising:
   (a) a pontoon having an upper surface adapted to support a vessel, said pontoon having a longitudinal axis, the length between ends of said pontoon being substantially greater than the width between sides of said pontoon, the depth of said pontoon being relatively shallow,
   (b) means to ballast or selectively to deballast said pontoon,
   (c) mechanical linkage means connected to said pontoon adjacent one end thereof and adapted to be connected to said fixed structure, said mechanical linkage means permitting rotation of said pontoon in said body of water about a horizontal axis perpendicular to the longitudinal axis of said pontoon, said mechanical linkage means restraining rotation of said pontoon about an axis parallel to the longitudinal axis of said pontoon,
   (d) a pair of stabilizing columns for providing longitudinal stability, each of said stabilizing columns being rigidly connected to a corner of said pontoon, said corners being located at opposite ends of one side of said pontoon, said stabilizing columns being in substantially unobstructing relation to the upper surface of said pontoon and the space between said stabilizing columns above the upper surface of said pontoon being clear of any structure appertaining to said floating dry dock, said stabilizing columns being of height sufficient to extend above the surface of the body of water when said pontoon is submerged, (e) said pontoon being adapted to support a vessel having a length and width substantially equal to the length and width respectively of said pontoon with the longitudinal axis of said vessel substantially parallel to the longitudinal axis of said pontoon and with one side of the vessel interposed between said stabilizing columns.

5. Apparatus as in claim 4, said mechanical linkage means comprising:
(f) a pair of first arms rigidly secured to opposite sides of said pontoon adjacent one end thereof,
(g) an elongated member adapted to be rotatably mounted to said fixed structure about a horizontal axis perpendicular to the longitudinal axis of said pontoon,
(h) a pair of second arms rigidly mounted to opposite ends of said elongated member,
(i) means pivotally mounting each of said second arms to one of said first arms.

6. Apparatus as in claim 4, said mechanical linkage means comprising:
(f) an elongated member of length substantially equal to the width of said pontoon,
(g) bearing means adapted to be rigidly mounted on said fixed structure, said bearing means rotatably supporting said elongated member about a horizontal axis perpendicular to the longitudinal axis of said pontoon, the center between ends of said elongated member registering with the longitudinal axis of said pontoon,
(h) a first arm at each end of said elongated member rigidly secured thereto,
(i) a second arm at each side of said pontoon adjacent one end thereof,
(j) means pivotally mounting each of said first arms to one of said second arms.

References Cited

UNITED STATES PATENTS 2,550,823   5/1951   King _____ 114—45

ANDREW H. FARRELL, *Primary Examiner.*